July 9, 1968

T. R. KENNEDY 3,392,320

STATIC FREQUENCY MULTIPLIER

Filed Jan. 28, 1965

INVENTOR
THEODORE R. KENNEDY

BY *Seidel & Gonda*

ATTORNEYS

July 9, 1968  T. R. KENNEDY  3,392,320
STATIC FREQUENCY MULTIPLIER
Filed Jan. 28, 1965  2 Sheets-Sheet 2

INVENTOR
THEODORE R. KENNEDY
BY
ATTORNEYS

United States Patent Office 3,392,320
Patented July 9, 1968

3,392,320
STATIC FREQUENCY MULTIPLIER
Theodore R. Kennedy, Willingboro, N.J., assignor to Inductotherm Corporation, Rancocas, N.J.
Filed Jan. 28, 1965, Ser. No. 428,703
22 Claims. (Cl. 321—7)

ABSTRACT OF THE DISCLOSURE

A static frequency multiplier for developing a 540 cycle single phase output from a three-phase 60 cycle input. The frequency multiplier includes a phase multiplying transformer with at least six coils electrically connected end to end and magnetically coupled in pairs of high and low turn coils, and nine tapping points provided on said coils at equally spaced electrical angles. Said tapping points being connected to non-linear saturable devices connected in sets of three with neutral points for developing a three-phase output at three times the source frequency, and a frequency tripler connected to the neutral points for providing a 540 cycle, single phase alternating current to a load.

This invention relates to a static frequency multiplier. More particularly, this invention relates to a static frequency multiplier for increasing the nominal 60 cycle input frequency to a nominal frequency of 540 cycles per second.

Frequencies above the nominal commercial frequencies of 50–60 cycles have been finding increased use. For example higher frequencies have been used in fluorescent lighting, high speed motors, induction heating, etc. Static frequency multipliers, used as frequency doublers or triplers, have been finding increasing favor as economical and efficient power sources for devices such as those listed above. For the most part frequency doublers and triplers rely upon the relatively abrupt magnetic saturation of transformer steel. An harmonic analysis of the saturation effects indicates that the third harmonic component predominates. This third harmonic, when combined with a three phase power source, provides a convenient and efficient means of converting an input frequency to three times the input frequency.

For frequencies abovet he third multiple, doubler systems have been used in one or more cascaded levels, the first level giving a multiple of 6(f) where (f) represents the input frequency, the second level being 12(f), etc. The present invention is concerned with another approach. That is, the present invention is based upon a method and apparatus wherein a high order phase number is derived from a polyphase primary power source by a transposer and the phase number thus derived is applied to a frequency multiplier. As used throughout the specification and claims, the word "transposer" refers to a phase multiplying transformer described herein; that is, a transformer for raising the phase number of the primary source. The frequency multiplier may be a frequency tripler or cascaded frequency triplers. The frequency multiplier number is chosen to be equal to the phase number.

Because of the aforesaid high energy third harmonic component during alternating current magnetic saturation, phase numbers as powers of the number 3 have been found to work out to the best advantage. Thus, the second power of 3 used as a frequency multiplier of 9 will provide an output current at 540 cycles for a 60 cycle three phase source. Rather than provide a nine phase integral unit to perform the multiplying function, it has been found advantageous to provide an intermediate stage using three tripling units to provide a three phase system of three times the source frequency. This three phase output is then applied to a fourth tripler to produce a single phase output of 9 times the source frequency. The first stage tripler units utilize three individually wound cores, per tripler unit, each wound core excited 120 electrical degrees from the other two. The phases of the second and third tripler units are shifted 40 and 80 electrical degrees respectively from the first unit thus using up the nine terminals of a nine phase primary supply. Each tripler unit of the first stage has its own neutral derived from a Y connection, which neutral points may be used as a source of three phase triple frequency current.

It is a general object of this invention to provide a novel static frequency multiplier.

It is another object of the present invention to provide a novel static frequency multiplier combining a transposer for developing a high order phase number and a frequency multiplier.

It is yet another object of the present invention to provide a static frequency multiplier having a novel transposer therein.

It is still another object of the present invention to provide a novel transposer for developing a high order phase number.

It is a further object of this invention to provide a novel transposer for developing a high order phase number with plural frequency multipliers to progressively increase a primary frequency of a phase number greater than one (1) to a desired higher frequency.

Other objects will appear hereinafter.

For the purpose of illustrating the invention, there are shown in the drawings forms which are presently preferred; it being understood, however, that this invention is not limited to the precise arrangements and instrumentalities shown.

Figure 1:
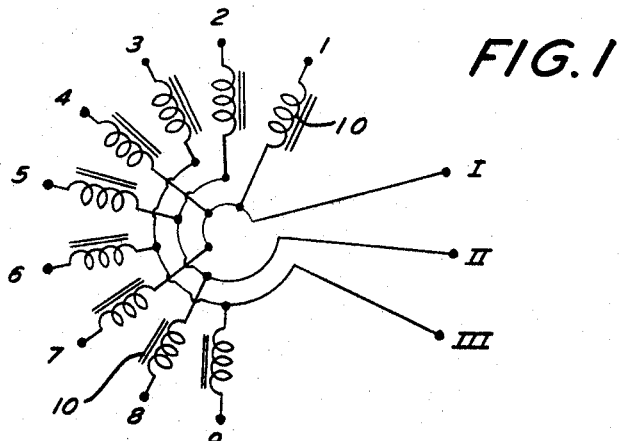
FIGURE 1 is a schematic illustration of saturating cores connected to a nine phase source.

Referring now to the drawings in detail, wherein like numerals indicate like elements, there shown in FIGURE 1 a composite diagram of nine wound saturating cores 10 connected to a nine phase supply. The nine phase supply has phase progression in the order 1, 2, 3, 4, 5, 6, 7, 8 and 9 as indicated in the drawing. The cores 10 are connected to three neutral points brought out as I, II and III. Neutral point I, which may alternatively be referred to as output terminal I, is associated with the wound cores 10 that are connected to phases 1, 4 and 7. Neutral point II is associated with the cores 10 that are connected to phase points 2, 5 and 8. Neutral point III is associated with the cores 10 that are connected to phase points 3, 6 and 9. The cores 10 connected to phase points 1, 4 and 7 and to neutral point I constitute a first tripler group. Cores 10 connected to phase points 2, 5 and 8 and neutral point II comprise a second tripler group, and cores 10 connected to phase points 3, 6 and 9 neutral point III comprise a third tripler group.

Figure 2:
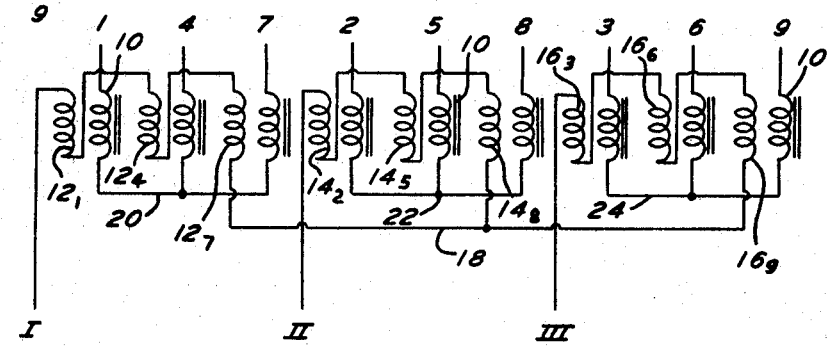
FIGURE 2 is a schematic illustration of tripler connection which may be connected to a nine phase source.

The cores 10 in each of the tripler groups may be provided with a common secondary winding which is connected with similar secondary windings in the other two groups to provide a three phase power supply, This is shown in FIGURE 2. The series connected secondary windings $12_{(1)}$, $12_{(4)}$, $12_{(7)}$; $14_{(2)}$, $14_{(5)}$, $14_{(8)}$; and $16_{(3)}$, $16_{(6)}$, $16_{(9)}$ associated with each of the first, second and third tripler groups are interconnected by the conductor 18 and brought out at points I, II and III to form a three phase triple frequency power supply. It should be noted that each of the cores 10 in each of the first, second and third tripler groups is Y connected at neutral points 20, 22 and 24.

Under saturating conditions from a nine phase source, the secondary neutral points I, II and II in FIGURE 2 are output terminals for a three phase current at three times input frequency. However, if points I, II and III are to be used, not only must a means be provided for supplying substantially nine phase power to input points 1, 2 . . . 9, but also a circuit for closing the path of the $3(f)$ currents back through points I, II and III must be provided.

Figure 3:
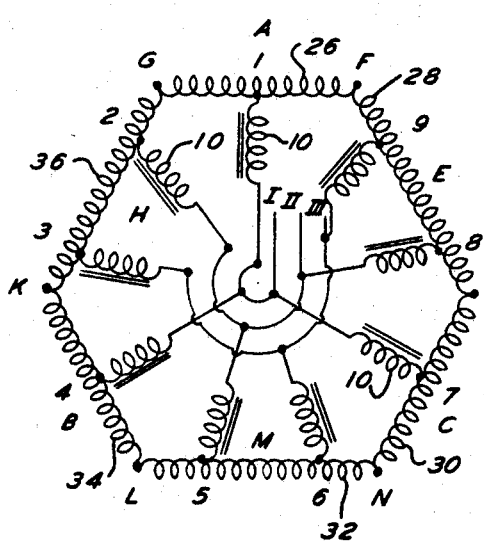
FIGURE 3 is a shcematic illustration of a circuit for providing nine phase currents from a three phase source.

FIGURE 3 illustrates a circuit which provides a nine phase current from a three phase source while at the same time providing circuitry for completing the three phase, $3(f)$ current path established at points I, II and III. As shown, the circuit includes six coils connected to form an irregular hexagon. The coils 26, 28, 30, 32, 34 and 36 are interconnected at points designated F, D, N, L, K, and G. The wound cores 10 are tapped off coils 26–36 at points 1, 2, 3, 4, 5, 6, 7, 8 and 9. Cores 10 are connected at their opposite ends in the manner shown in FIGURE 1, with neutral points I, II and III being brought out as shown. Winding 26–36 provide a circuit to fulfill the requirements of a nine phase source and closed circuit path.

Figure 4:
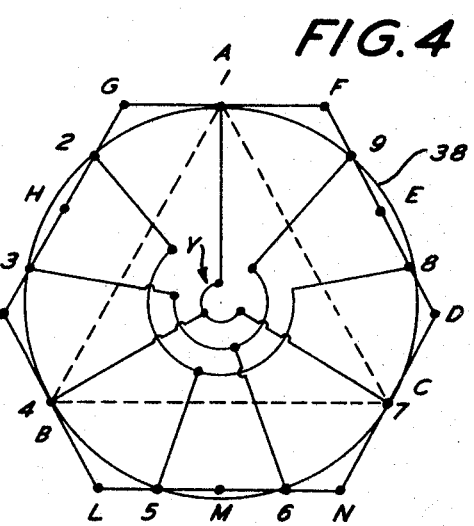
FIGURE 4 is a vector diagram illustrating the relative phase and voltages for the circuit of FIGURE 3.

FIGURE 4 is a mixed vector diagram which illustrates the relative phases and voltages for the circuit connection of FIGURE 3. In FIGURE 4 a circle 38 with its center at Y is drawn through points 1, 2 . . . 9 representing the relative phase relations of cores 10. Radials 1–Y, 2–Y, 3–Y, 4–Y, 5–Y, 6–Y, 7–Y, 8–Y, and 9–Y are drawn so that the included angle between pairs of radials is 40 electrical degrees. This establishes the nine phase relationship with a phase progression of 1, 2 . . . 9 as set forth in the description of FIGURE 1. A second set of vector lines of equal length to represent equal intensities, is drawn through points 2–3, 5–6, and 8–9. A vector line N–D parallel to the line 2–3 is drawn through point 7. A vector line K–L parallel to vector 8–9 is drawn through point 4. And a vector line G–F parallel to line 5–6 is drawn through point 1. By thusly drawing the vector lines, an irregular hexagon with parallel opposite sides is completed. Moreover, a circle with nine radials intersecting the irregular hexagon has been developed such that the radials are equally spaced at 40 electrical degrees.

By comparing FIGURES 3 and 4 it is apparent that vector line L–N in FIGURE 4 represents windings L–N in FIGURE 3 and vector line F–G, which is parallel, represents winding F–G. This indicates that the corresponding windings are magnetically tightly coupled such as would occur when they are wound on the same core. The same analysis also applies when parallel vectors F–D and K–L are compared to windings F–D and K–L, and also when parallel vectors K–G and N–D are compared with windings K–G and N–D.

Trigonometric analysis of the irregular hexagon shown in FIGURE 4 shows that vector line F–G is 82.9 percent of the length of vector line L–N. This relative vector length can be used to measure turn ratios. Thus, the relationship between vectors F–G and L–N can be used to indicate that the turn ratio of winding F–G to L–N is .829. Stated otherwise, this indicates a ratio of 1.00 to 1.20 for each pair of parallel windings. A similar analysis applies to the relationship between the remaining vectors and windings. Thus, if the vector diagram shown in FIGURE 4 is accurately drawn the turn ratio or tapping points of the other connection points such as 2, 3, etc., may be established using a measuring scale. Trigonometric methods may also be used to establish the turn ratios or voltage ratios to any degree of accuracy. Analysis also indicates that vector lines KG, FD, and LN are intercepted by radials at a distance from their ends of approximately 22 percent of their length.

Table I gives some of the more useful relations which can be derived from the vector diagram of FIGURE 4.

*Table I.—Voltage or turn ratios between designated points*

| Points: | Ratio |
|---|---|
| 1–4 | 1.000 |
| 4–7 | 1.000 |
| 7–1 | 1.000 |
| 1–Y | .577 |
| F–G | .586 |
| L–N | .708 |
| 1–5 | 1.1371 |
| L–Y | .6474 |
| L–M | .354 |
| H–Y | .543 |
| G–Y | .647 |
| 1–G | .293 |
| L–5 | .156 |
| 5–6 | .395 |
| F–L | 1.2922 |
| A–F | .293 |

Since phase points A(1), B(4), and C(7) are midpoints of similar windings and together define an equilateral triangle represented by the dotted line in FIGURE 4, they may be used as an input connection points for a three phase power source. The nine phase terminals are established at points 1, 2, 3, 4, 5, 6, 7, 8 and 9. The respective triangles established by points 1, 4 and 7; 2, 5 and 8; and 3, 6 and 9 are congruent representing the three coil assemblies having outputs at I, II and III in FIGURE 3.

Figure 5:
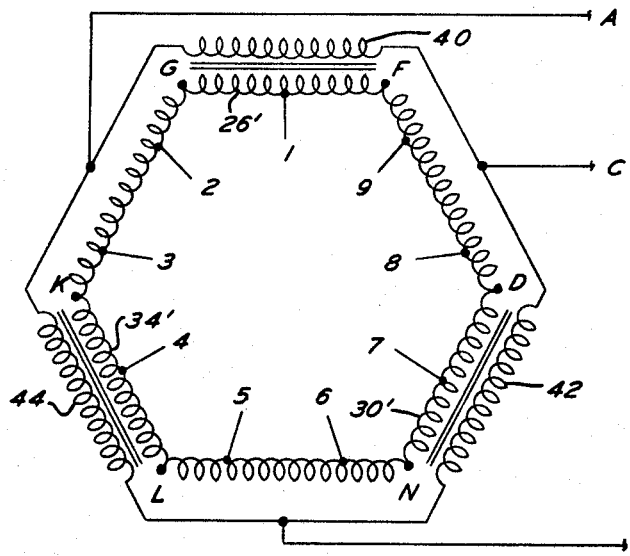
FIGURE 5 is a schematic illustration of a modification of the circuit shown in FIGURE 3.

The mid-points M, E and H of the windings 32(LN), 28(FD), 36(KG) opposite to windings GF, KL and DN having mid-points A, B and C may also be chosen for connection to a three phase source. In this case the nine phase voltages are about 6.4 percent higher than the voltages produced by connections to points A, B and C. Thus, in either case, the winding mid-points may be used for three phase source connections where the source voltage is suitable for saturating the cores of windings 10.

Where the source voltage is not suitable for saturating the cores of windings 10, another set of coupled windings connected in Y or Δ can be used to obtain the desired nine phase points. By way of example, a delta connected primary winding is shown in FIGURE 5. The primary windings 40, 42 and 44 arranged in delta connection and adapted for connection to a three phase source A, B and C. Windings 40, 42 and 44 are magnetically coupled to coils 26′, 30′ and 34′. Otherwise, FIGURE 5 represents a schematic connection for producing the nine phase voltage which is the same as that of FIGURE 3.

As indicated above, the vector diagram of FIGURE 4 shows that parallel sides of the hexagon configuration are magnetically coupled. Accordingly, parallel windings shown in FIGURES 3 and 5 are magnetically closely coupled. This is achieved by winding parallel windings on the same transformer core. Accordingly, a standard three leg three phase core may be used. That is, primary winding 40 is inductively coupled with windings GF and LN on the same transformer core. Similarly winding 44 is inductively coupled with windings LK and DF on the same transformer core, and winding 42 is inductively coupled on the same transformer core with windings ND and GK.

Figure 6:
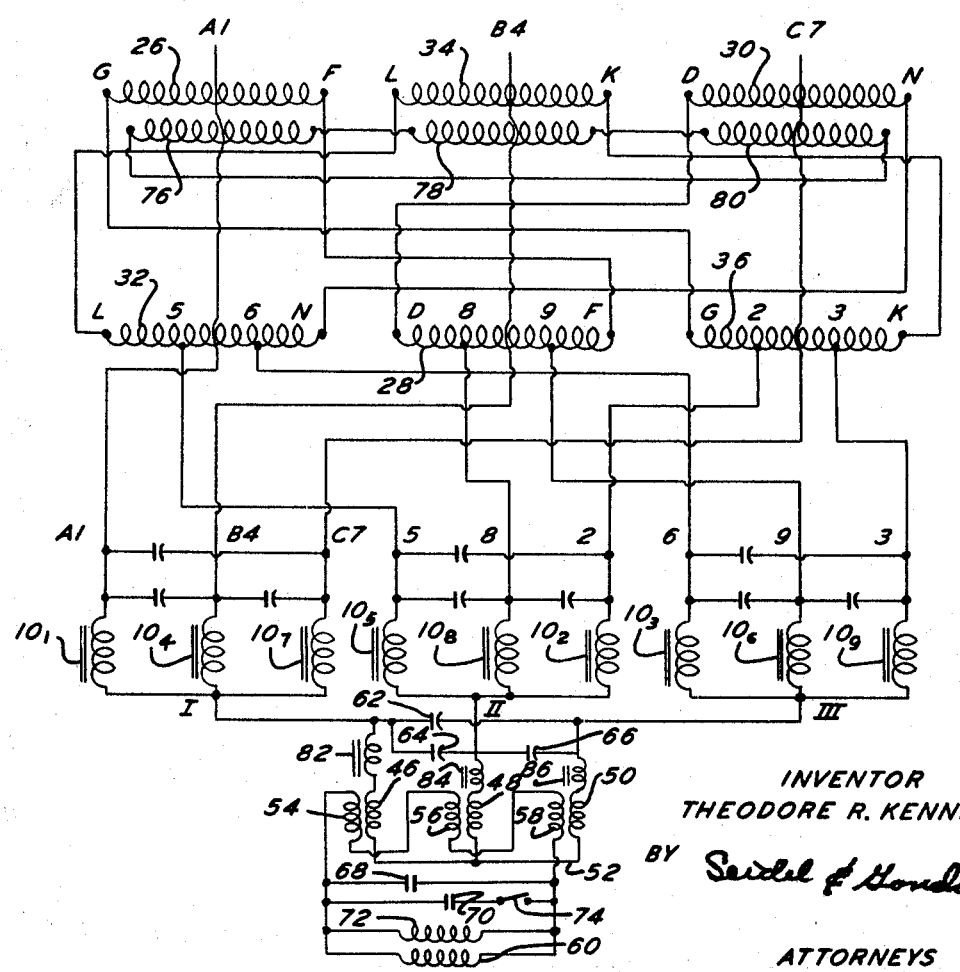
FIGURE 6 is a schematic illustration of a circuit diagram for converting three phase 60 cycle current to single phase 540 cycle current for application to an induction furnace.

Referring now to FIGURE 6, there is shown a schematic diagram of a static frequency multiplier for increasing a three phase source at commercial frequencies to a single phase frequency at nine times the source of frequency. The output current is applied to an induction furnace 60. As shown, the static frequency multiplier in FIGURE 6 uses a transposer for developing a nine phase frequency source in the manner of the circuit shown in FIGURE 3. Thus, although the windings have been positioned differently to better illustrate the device, their connections are the same and they are magnetically coupled on the same cores described with respect to the FIGURE 3.

The saturable cores 10(1), 10(2) . . . 10(9) are connected to a nine phase source represented by winding 26–36. In FIGURE 6 the saturable cores of windings 10 are grouped in their respective tripler group representing phases 1, 4 and 7; 5, 8 and 2; and 6, 9 and 3. As with the connection shown in FIGURE 3, their output is taken from points I, II and III. Three saturable cores and windings 46, 48 and 50 are connected to output points I, II and III. A neutral connection at the other end of cores 46, 48 and 50 is provided at 52. As thus connected windings 46, 48 and 50 form a fourth tripler group. Secondary windings 54, 56 and 58 are magnetically coupled to the saturable cores 46, 48 and 50. Windings 54, 56 and 58 are arranged in open delta connection. An induction heating furnace is represented by coil 60 is connected between the open terminals of secondary windings 54, 56 and 58. A capacitor 62 is connected between output I and III. A second capacitor 64 is connected between output points I and II. A third capacitor 66 is connected between output points II and III.

The capacitors 62, 64 and 66 will absorb certain portions of the harmonic components of current that may be generated, but the third harmonic and odd multiples thereof are not absorbed by these capacitors. Thus, capacitors 62, 64 and 66 act as shunting capacitors for all harmonics except the third harmonic and odd multiples thereof.

Capacitors 68 and 70 together with saturable reactor 72 are connected in parallel with the induction heating coil 60 to provide power factor correction. As shown, capacitor 70 may be switched into and out of the circuit by means of switch 74 to adjust the power factor. Similarly, means may be provided to adjust the inductive capacity of saturable core reactor 72 to provide further fine tuning.

As thus described, the circuit shown in FIGURE 6 transposes three phase source to a nine phase current by means of a transformer connection in the form of an irregular hexagon. The three phases are tapped off at the points 1, 2, 3 . . . 9 and connected to 3 tripler groups of three saturating cores and winding 10. The 3 tripler groups, consisting of phases 1, 4 and 7, phases 5, 8 and 2, and phases 6, 9 and 3 respectively, are symmetrical and act as triplers to produce an output current at 3 times the input frequency. The $3(f)$ output current is taken from neutral points I, II and III and connected to a fourth tripler represented by the primary coils 46, 48 and 50 and the secondary coils 54, 56 and 58. The secondary coils 54, 56 and 58 are connected in open delta to a load 60. The frequency applied to load 60 is nine times the input frequency.

The nature of the connections described above, permits the three phase $3(f)$ currents at points I, II and III to divide into three generally equal components. That is, in the tripler represented by phases 1, 4 and 7 and the neutral point I, equal $3(f)$ currents flow back from point I through saturating elements $10_1$, $10_4$ and $10_7$ into appropriate tapping points on the hexagonally connected transposer. These currents flow through the transposer windings such that the algebraic sum of the $3(f)$ currents to and from the hexagonal transposer is zero in conformity with standard three phase alternating current analysis.

By means of a diagram such as that shown in FIGURE 4, with the irregular hexagon representing the 6 tapped and interconnected windings of the transposer and the radials representing the saturating elements, it has been determined that there is an ampere-turn dissymmetry to the $3(f)$ current in the transposer. A delta connected winding on the 3 cores of the transposer will effectively cancel the unbalanced ampere-turn with minor power loss and highly satisfactory current balance. The general value of the compensating ampere-turns is approximately by the formula:

$$i_c n_c = .12 i_I n_{(w)}$$

where:

$i_c$ represents the compensating current
$n_c$ represents the number of compensating turns
$i_I$ represents the tripler current
$n_{(w)}$ represents the number of turns on the transposer windings corresponding to 26, 30 and 34 in FIGURE 3.

The compensating winding is represented in FIGURE 6 by the coils 76, 78 and 80 connected in delta formation. Being thusly connected, the compensating winding may also serve the double purpose of being both a compensating winding and the primary source winding. This is shown in FIGURE 5. If the winding 76, 78 and 80 of FIGURE 6 is used for this double purpose, the conductors size is adjusted to carry the power current and the compensating current. Star connected primaries (not shown) could also be used.

It has been found advantageous to insert linear chokes 82, 84 and 86 between the appropriate capacitors 62, 64 and 66 and the neutral connections I, II and III for the tripler assemblies of FIGURE 6. The function of chokes 82, 84 and 86 may be taken over by auxiliary cores in the tripler elements which are magnetically parallel to the saturating cores. Such auxiliary cores have low but relatively stable permeability at high magnetizing forces, as is described in co-pending application Ser. No. 216,503, filed Aug. 13, 1962, and entitled Frequency Tripler. The chokes 82, 84 and 86, or their functional equivalent help to stabilize the operation of equipment by adjusting the apparent magnetic saturation characteristic of tripler elements 46, 48 and 50, so that the $3(f)$ voltage across terminals I, II and III does not need impractically close adjustment.

The saturating elements 46, 48 and 50 are preferably made of magnetically oriented steel laminations wound into toroidal form to produce a sharp "knee" in the magnetizing curve. The slope of the magnetizing curve beyond the "knee" is raised enough to allow a practical relationship between the applied $3(f)$ voltage and the tripler magnetizing current in the high saturation region. The saturating element 10 may also have auxiliary stabilizing cores to improve their performance and stability in relation to source voltage.

The present invention may be embodied in other specific forms without departing from the spirit or essential attributes thereof and, accordingly, reference should be made to the appended claims, rather than to the foregoing specification as indicating the scope of the invention.

I claim:

1. A static frequency multiplier comprising a phase multiplying transformer for increasing the phase number of a multi-phase source, and cascaded frequency multipliers electrically connected to the increased output phases of said transformer, said frequency multipliers being connected to increase the frequency of the source by a number equal to the increased output phase number of said transformer.

2. A transposer for increasing the phase number of a multi-phase source comprising a transformer core having three legs, a pair of windings on each leg, one winding on each leg having a greater number of turns than the other winding by a predetermined ratio, all said windings being electrically connected with each winding in a pair being separated by a high and low turn ratio winding of the remaining pairs, and tapping points on each winding, said tapping points being at equally spaced electrical phase angles.

3. A transposer for increasing the phase number of a multi-phase source comprising a transformer core having three legs, first and second windings on each leg, said first and second windings being in a ratio of approximately 1.00 to 1.20, a center tap on each of said first windings, a pair of taps on each of said second windings at a predetermined number of turns from the ends thereof, said windings being electrically connected in a series so that each winding in a pair is separated by a first and second winding of the remaining winding.

4. A transposer in accordance with claim 3 wherein said taps on said second windings are spaced approximately 22% of the turns from the ends thereof.

5. A static frequency multiplier comprising a phase multiplying transformer for converting a three phase alternating current input to a nine phase output, said nine phases being spaced apart by an equal number of electrical degrees, first, second and third frequency tripler units, said first unit being associated with a first, fourth and seventh transformer output phase, said second unit being associated with a second, fifth and eighth transformer output phase, said third unit being associated with a third, sixth and ninth transformer output phase, said tripler units being connected to develop a three phase output at three times the input frequency of said transformer.

6. A static frequency multiplier in accordance with claim 5 including a fourth tripler unit electrically connected to the triple frequency output of said first, second and third tripler units, said fourth tripler unit developing a single phase output at nine times the input frequency of said transformer.

7. A static frequency multiplier comprising a transformer for increasing the phase number of a multi-phase source comprising a transformer core having three legs, a pair of windings on each leg, one winding on each leg having a greater number of turns than the other winding by a predetermined ratio, said windings being electrically connected so that each winding in a pair is separated by a high and low turn ratio winding of the remaining pairs, a center tap on said windings having a lesser number of turns, a pair of taps spaced inwardly by a predetermined equal number of turns from opposite ends of said windings having a greater number of turns, first, second and third tripler units electrically connected to said taps for developing a three phase output at three times the input frequency of said static frequency multiplier.

8. A static frequency multiplier in accordance with claim 7 including a fourth tripler unit electrically connected with the three phase tripler frequency output of said first, second and tripler units for developing an output at nine times the input frequency of said static frequency multiplier.

9. A static frequency multiplier in accordance with claim 7 wherein said pairs of windings have a turn ratio of approximately 1.00 to 1.20, and said windings having a larger number of turns are tapped at approximately 22% of the turns from their ends.

10. A static frequency multiplier comprising a transformer for converting a three phase input into a nine phase output, said transformer including a transformer core having three legs, first and second windings on each leg, said first and second windings having a turn ratio of approximately 1.00 to 1.20, a center tap on said first windings, a pair of taps on said second winding each spaced inwardly a predetermined number of turns from opposite thereof, each set of first and second windings being electrically connected so that each winding is separated by a first and second winding of the remaining windings, first, second and third frequency tripler units connected to said nine phase transformer output, said first, second and third tripler units connected for developing a three phase output at three times the input frequency of said frequency multiplier, and a compensating winding magnetically coupled with each of said first windings to neutralize harmonic frequency current unbalance created by said first, second and third tripler units.

11. A static frequency multiplier in accordance with claim 10 wherein the ampere-turns of said compensating winding is related to that of said first winding in accordance with the following:

$$i_c n_c = .12 i_t n_{(w)}$$

$i_c$ represents the compensating current
$n_c$ represents the number of compensating turns
$i_t$ represents tripler unit current
$n_{(w)}$ represents the number of turns on the first transposer windings.

12. A static frequency multiplier in accordance with claim 10 wherein said first windings on each leg are secondary windings magnetically coupled to primary windings wound on said legs, the current carrying capacity of said primary windings adapted to cancel said current included in said primary windings, said primary windings beng connected in delta.

13. A static frequency multiplier comprising a phase multiplying transformer for increasing the phase number of a 3-phase source to 9, three frequency triplers connected to the increased output phases of said transformer to provide a 3-phase frequency at three times the source frequency, said frequency triplers being connected to provide a return circuit for the increased frequency developed by said triplers.

14. A static frequency multiplier in accordance with claim 13 wherein a fourth frequency tripler is connected to the output of said three frequency triplers for producing a single phase output at nine times the source frequency.

15. A static frequency multiplier in accordance with claim 13 wherein the nine phases are equally spaced at angles of forty electrical degrees, and each of said three frequency triplers has a neutral point, said frequency triplers being connected to develop a voltage at the neutral point which is three times the source frequency.

16. A static frequency multiplier in accordance with claim 15 wherein a fourth frequency tripler is connected to the neutral points of said three frequency triplers, said fourth frequency tripler being a transformer having a primary and secondary, said primary being connected in Y to the output of said three frequency triplers, and the secondary of said frequency tripler being connected in open delta to provide a voltage at nine times the frequency of the source.

17. A transposer for increasing the phase number of a multi-phase source comprising three sets of first and second windings, one winding in each set having a greater number of turns than the other winding by a predetermined ratio, the windings in each set being closely magnetically coupled, all of said windings being electrically connected to each other with each winding in a set being separated by a high and low turn ratio winding of the remaining sets, and tapping points on each winding.

18. A transposer in accordance with claim 17 wherein the turns ratio between the windings in each set is approximately 1.00 to 1.20, a center tap on each of the windings having a lower number of turns, two spaced apart taps on each of the windings having a greater number of turns, each of said two taps being spaced inwardly by an amount equal to approximately 22% of the turns from the ends of said windings having a greater number of turns.

19. A static frequency multiplier comprising a transformer for increasing the phase number of a multi-phase source, said transformer including three sets of first and second windings, one winding in each set having a greater number of turns than the other winding by a predetermined ratio, the windings in each set being closely magnetically coupled, all of said windings being electrically connected to each other with each winding in a set being separated by a high and low turn ratio winding of the remaining sets, and tapping points on each winding, the turns ratio between the windings in each set being approximately 1.00 to 1.20, a center tap on each of the windings having a lower number of turns, two spaced apart taps on each of the windings having a greater number of turns, each of said two taps being spaced inwardly by an amount equal to approximately 22% of the turns from the ends of said windings having a greater number of turns, said transformer being connected to produce a nine phase output from a three-phase input, three sets of frequency triplers connected to provide a three-phase output at three times the source frequency of said transformer, and a fourth frequency tripler connected to the output of said three sets of frequency triplers for producing a single phase output at nine times the source frequency.

20. A transposer in accordance with claim 17 including a compensating winding for neutralizing ampere-turn dissymmetry when said transposer is connetced to a frequency multiplier.

21. A transposer in accordance with claim 20 wherein said compensating winding is connected in delta, said compensating winding being coupled to said sets of windings and being wound to be connected as a transformer primary winding for said transposer.

22. A static frequency multiplier comprising a phase multiplying transformer for increasing the phase number of a multiphase source to provide an increased number of symmetrically spaced phases, frequency multiplier means electrically connected to the increased output phases of said transformer, said frequency multiplier means being electrically connected to points on the transformer windings to provide a symmetrical, balanced multi-phase output of increased frequency relative to the frequency of said multi-phase source.

References Cited

UNITED STATES PATENTS

| | | | |
|---|---|---|---|
| 3,309,604 | 3/1967 | Bussey | 321—68 |
| 3,311,810 | 3/1967 | Sample | 321—68 |
| 1,948,119 | 2/1934 | Lobl | 321—7 |
| 2,470,598 | 5/1949 | Biebesheimer | 336—12 |
| 2,790,131 | 4/1957 | Nyyssonen | 321—57 |
| 3,026,467 | 3/1962 | Barnes | 321—5 |
| 3,219,834 | 11/1965 | Smithies | 321—57 X |

FOREIGN PATENTS

| | | |
|---|---|---|
| 116,701 | 3/1959 | U.S.S.R. |

JOHN F. COUCH, *Primary Examiner.*

WARREN E. RAY, *Examiner.*

G. GOLDBERG, *Assistant Examiner.*